US012694309B2

(12) United States Patent
Agarwal et al.

(10) Patent No.: US 12,694,309 B2
(45) Date of Patent: Jul. 28, 2026

(54) COMPUTER-BASED SYSTEMS HAVING COMPUTER ENGINES AND DATA STRUCTURES CONFIGURED FOR MACHINE LEARNING DATA INSIGHT PREDICTION AND METHODS OF USE THEREOF

(71) Applicant: American Express Travel Related Services Company, Inc., New York, NY (US)

(72) Inventors: Varun Agarwal, New Delhi (IN); Krishnaprasad Narayanan, Bangalore (IN); Rahul Ghosh, Bangalore (IN); Swetha Srinivasan, Bangaluru (IN); Anshul Jain, Gurgaon (IN); Bobby Chetal, Gurgaon (IN); Ashni Jauhary, Gurgaon (IN)

(73) Assignee: American Express Travel Related Services Company, Inc., New York, NY (US)

( * ) Notice: Subject to any disclaimer, the term of this patent is extended or adjusted under 35 U.S.C. 154(b) by 37 days.

(21) Appl. No.: 18/367,330

(22) Filed: Sep. 12, 2023

(65) Prior Publication Data

US 2025/0086494 A1     Mar. 13, 2025

Related U.S. Application Data

(63) Continuation of application No. 16/704,407, filed on Dec. 5, 2019, now Pat. No. 11,797,868.

(51) Int. Cl.
G06N 5/04          (2023.01)
G06F 16/25        (2019.01)
(Continued)

(52) U.S. Cl.
CPC ............. G06N 5/04 (2013.01); G06F 16/252 (2019.01); G06N 5/01 (2023.01); G06N 7/01 (2023.01); G06N 20/00 (2019.01); G06N 20/20 (2019.01)

(58) Field of Classification Search
CPC .................................................... G06N 20/00
See application file for complete search history.

(56) References Cited

U.S. PATENT DOCUMENTS

| 11,797,868 B1 | 10/2023 | Agarwal et al. | |
| 2005/0039107 A1* | 2/2005 | Hander .................. | G06F 40/56 |
| | | | 715/256 |

(Continued)

OTHER PUBLICATIONS

Xie et al., VAET: A Visual Analytics Approach for E-transactions Time-Series, IEEE Transactions on Visualization and Computer Graphics, vol. 20, No. 12, Dec. 2014, pp. 1743-1752 (Year: 2014).*

(Continued)

*Primary Examiner* — Daniel T Pellett
(74) *Attorney, Agent, or Firm* — STERNE, KESSLER, GOLDSTEIN & FOX P.L.L.C.

(57) ABSTRACT

Disclosed herein are method, system, and computer product embodiments for generating a textual summary of a data set based on traversing a decision tree according to sequence and rank numbers related to a query. Subsets of the data set may receive a rank number indicating the relevancy of the subset of data to the query. In response to traversing the decision tree, a textual summary representative of the data set and subsets of data may be generated and displayed. The textual summary may also include a course of action recommendation based on the culmination of the data set and relevant data subsets.

20 Claims, 9 Drawing Sheets

500

(51) Int. Cl.

| | | |
|---|---|---|
| *G06N 5/01* | (2023.01) | |
| *G06N 7/01* | (2023.01) | |
| *G06N 20/00* | (2019.01) | |
| *G06N 20/20* | (2019.01) | |

(56) References Cited

U.S. PATENT DOCUMENTS

| | | | |
|---|---|---|---|
| 2007/0106582 A1 | 5/2007 | Baker et al. | |
| 2007/0179966 A1 | 8/2007 | Li et al. | |
| 2015/0227701 A1* | 8/2015 | Nicolaas | G16H 50/20 |
| | | | 705/2 |
| 2018/0232659 A1* | 8/2018 | Ranatunga | G06Q 30/0241 |
| 2019/0156196 A1 | 5/2019 | Zoldi et al. | |
| 2020/0387832 A1* | 12/2020 | Jordan | G06N 5/045 |

OTHER PUBLICATIONS

Learn by Marketing Blog, Classification and Regression Trees Explained, retrieved from web.archive.org dated Nov. 25, 2019, 5 pages (Year: 2019).
Bolton et al., Unsupervised Profiling Methods for Fraud Detection, published 2002, 17 pages (Year: 2002).

* cited by examiner

200
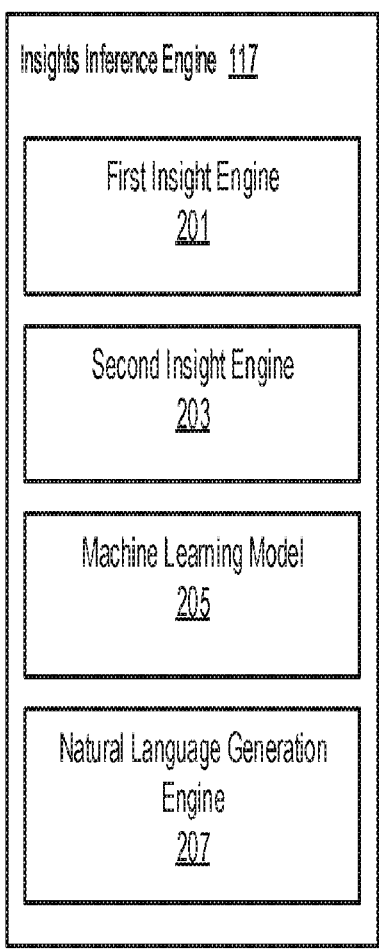
Insights Inference Engine  117
First Insight Engine
201
Second Insight Engine
203
Machine Learning Model
205
Natural Language Generation
Engine
207
FIG. 2

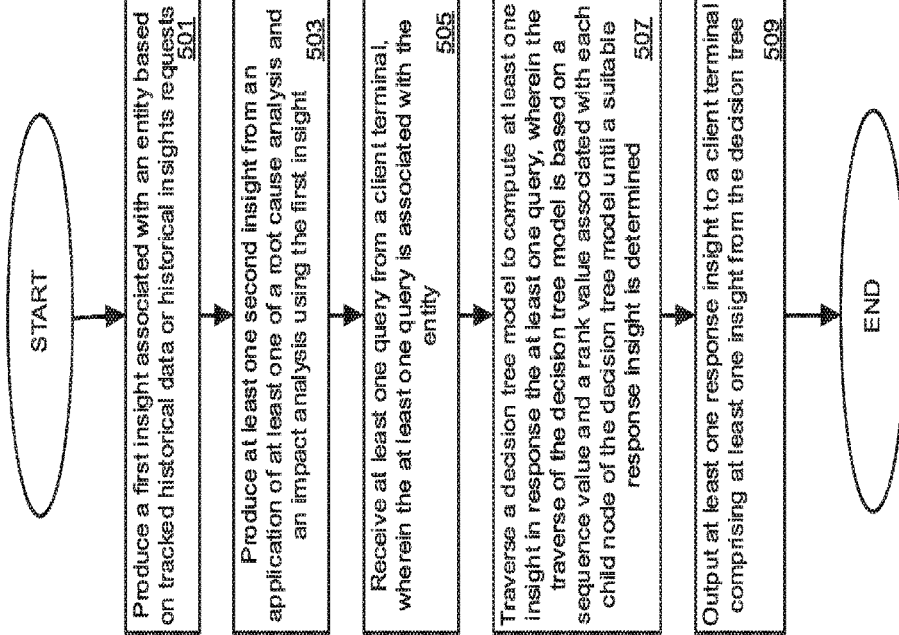

500

START

Produce a first insight associated with an entity based on tracked historical data or historical insights requests    501

Produce at least one second insight from an application of at least one of a root cause analysis and an impact analysis using the first insight    503

Receive at least one query from a client terminal, wherein the at least one query is associated with the entity    505

Traverse a decision tree model to compute at least one insight in response the at least one query, wherein the traverse of the decision tree model is based on a sequence value and a rank value associated with each child node of the decision tree model until a suitable response insight is determined    507

Output at least one response insight to a client terminal comprising at least one insight from the decision tree    509

END

FIG. 5

600

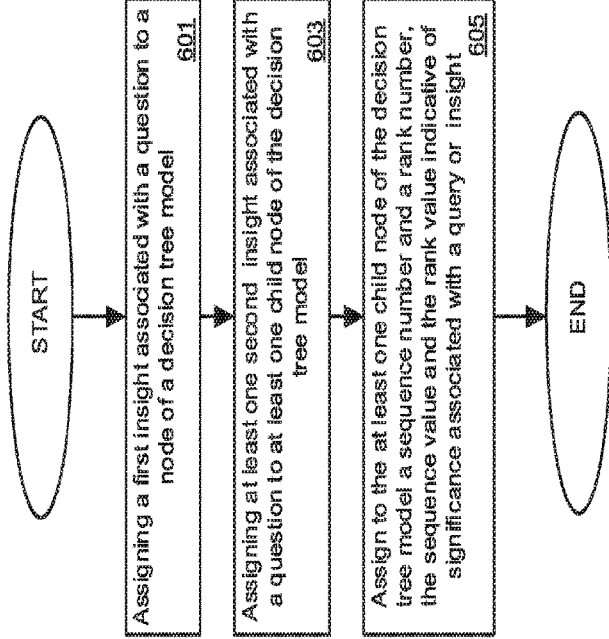

START

Assigning a first insight associated with a question to a node of a decision tree model          601

Assigning at least one second insight associated with a question to at least one child node of the decision tree model          603

Assign to the at least one child node of the decision tree model a sequence number and a rank number, the sequence value and the rank value indicative of significance associated with a query or insight          605

END

Display 113

701 ———▶ Insight: Your cost per day for Ground Transport stands at $15 which is higher than your peers 703 ———▶ Driver: The top two highest cost per day markets are UK and Singapore 705 ———▶ Impact: The impact of this higher cost per day is $400,000

707 ———▶ Recommendation: Opportunity to save $50,000 by shifting to less expensive mode of transport, for example, Metro

800
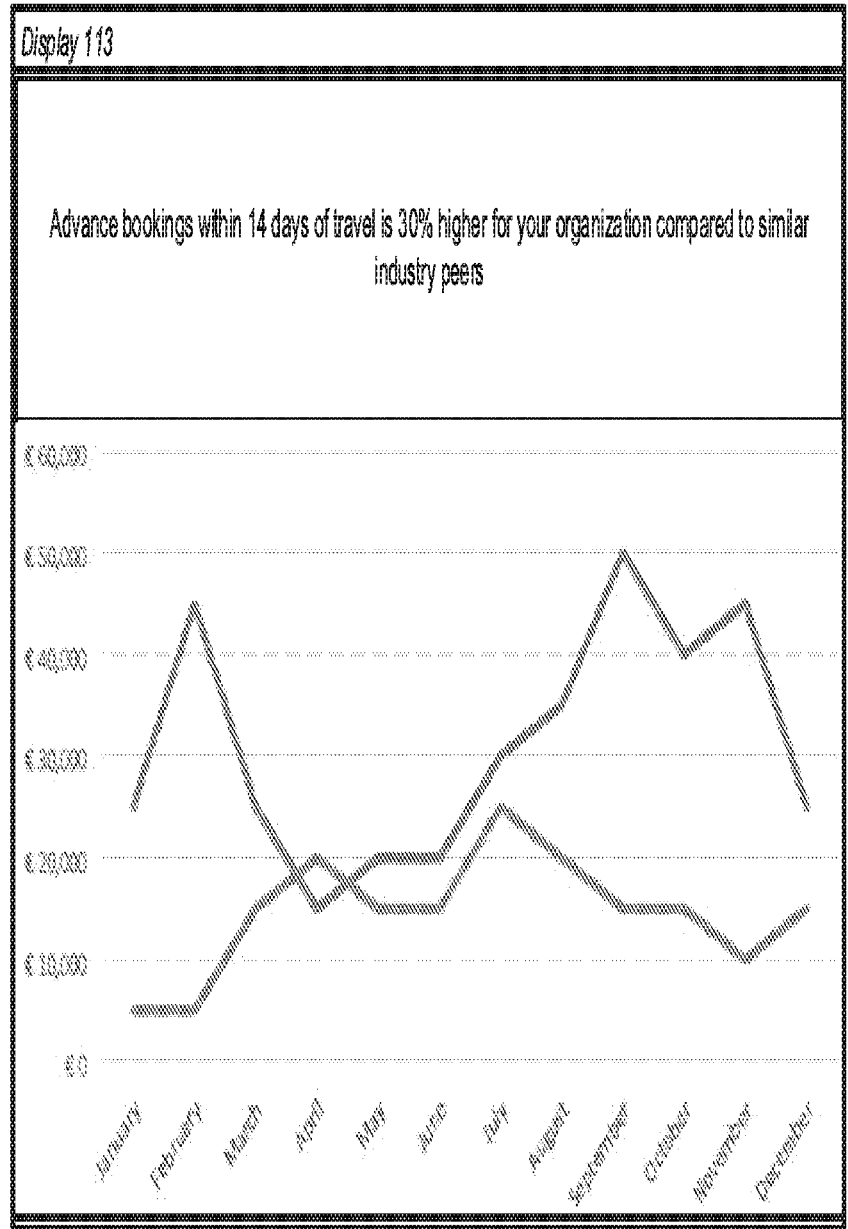
FIG. 8

900

901    903    905    911

Client Device    Client Device    Client Device    User

Network
907

909

Network Server

COMPUTER-BASED SYSTEMS HAVING COMPUTER ENGINES AND DATA STRUCTURES CONFIGURED FOR MACHINE LEARNING DATA INSIGHT PREDICTION AND METHODS OF USE THEREOF

BACKGROUND OF TECHNOLOGY

A computer system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

Some computing devices may store large records of complementary and divergent data associated with one or more entities. Thus, determining, inferring, and predicting insights for a specific entity can sometimes be an inaccurate, resource intensive, and complex problem.

SUMMARY OF DESCRIBED SUBJECT MATTER

In some embodiments, the present disclosure provides a technically improved computer-based system/method/apparatus that includes at least the following components/steps of a computer-based insights inference system that produces multiple insights associated with an entity. The insights inference system generates a decision tree machine learning model, assigning a first insight to a parent node of a decision tree machine learning model and assigning at least one second insight to child nodes of the decision tree machine learning model. Each child node from the decision tree machine learning model is associated with a sequence number and a rank number. The sequence number and the rank number are indicative of a significance associated with the at least one second insight. The insights inference system responds to queries by traversing the decision tree machine learning model to compute at least one response insight based on the sequence number and the rank number associated with each child node of the decision tree machine learning model. In some instances, the insights inference system does not traverse at least one node from the decision tree machine learning model based on unmet criteria associated with the sequence number and the rank number of that node. The insights inference system outputs the at least one response insight to a client terminal utilizing at least one natural language generation technique.

In some embodiments, insights can be produced based on statistical analysis such as a trending statistical analysis, Pareto statistical analysis, and benchmarking statistical analysis. Insights can also be produced based on root cause analysis and impact analysis. Insights can include at least one of a cause insight, impact insight, and recommendation insight and can be updated based on a periodic time interval. Insights can include data patterns associated with an entity and the data pattern can be generated in real time or near real time. Insights can include a comparison of a first insight and a second insight, wherein the first insight is associated with a first entity and the second insight is associated with a second entity.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

FIGS. 1-9 show one or more schematic flow diagrams, certain computer-based architectures, and/or screenshots of various specialized graphical user interfaces which are illustrative of some aspects of at least some embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 9 illustrate systems and methods for prediction of insights based on machine learning techniques. The following embodiments provide technical solutions and/or technical improvements that overcome technical problems, drawbacks and/or deficiencies in the technical field of machine learning. As explained in more detail, below, technical solutions and/or technical improvements herein include aspects of improved machine learning predictions of customized insights relevant to an entity or entities. Moreover, various practical applications of the disclosed technology are also described, which provide further practical benefits to users and operators that are also new and useful improvements in the art.

Figure 1:
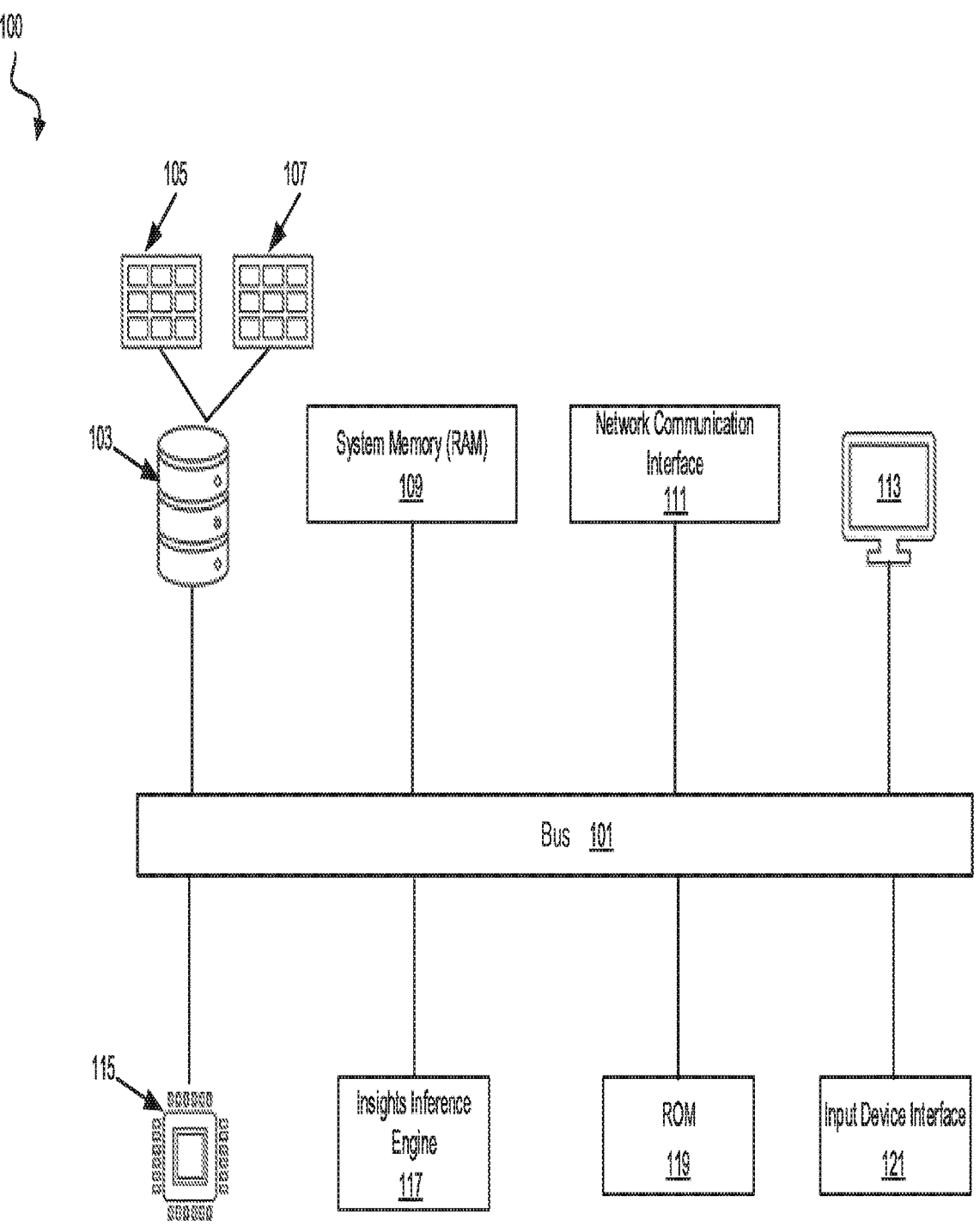

FIG. 1 illustrates an example of an implementation of an insights inference system, in accordance with one or more embodiments of the present disclosure. In some embodiments, an insights inference system 100 can include a communication bus 101, a processor 115, a system memory (RAM) 109, a read-only memory (ROM) 119, a database or storage device 103, an input device interface 121, an output device interface such as display 113, and a network communication interface 111.

In some embodiments, the communication bus 101 collectively represents system, peripheral, and/or chipset buses that communicatively connect the numerous internal devices of the insights inference system 100. The communication bus 101 may be a physical interface for interconnecting the various components, however in some embodiments, the communication bus 101 may be a network interface, router, switch, or other communication interface.

In some embodiments, the insights inference system 100 may receive and/or store multiple datasets or records, for example, datasets or records 105 and 107. Datasets or records 105 and 107 can include data values or data points associated with historical data associated with one or more users, or non-person entities such as commercial entities, including merchants, industrial entities, firms and businesses, governmental organizations or other suitable nonperson entities. Some examples of historical data can include data related to complex operations involving groups of people, facilities, supplies, or other suitable type of logistical or historical data. The various components of the insights inference system 100 may interoperate to detect, predict, and/or infer complex patterns associated with a user or non-person entity through the insights inference engine 117 discussed below with respect to FIG. 2.

In some embodiments, the insights inference system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, error logs, security reports, among other data related to the operation of the insights inference system 100.

In some embodiments, a database or storage device 103 stores datasets or records 105 and 107 including data values with historical data associated with one or more users and non-person entities. The datasets or records 105 and 107 can include variables associated with, for example, complex operations involving groups of people, facilities, supplies, historical activities associated with a user or non-person entity or other suitable type of historical data. The database or storage device 103 can be updated in real-time or near real-time when, for example, an event related to a user, groups or users or non-person entities occurs. In some implementations the database or storage device 103 can be part of a financial institution system, merchant system, online store system, or other suitable entity capable of registering electronic activities once the activities are performed by a user or non-person entity, or an event affecting a user or non-person entity occurs. One or more components of the system 100 can communicate with database or storage device 103 via, e.g., the communication bus 101 to retrieve datasets or records 105 and 107 in real-time or near real-time. Accordingly, the insights inference system 100 can detect, predict, or infer in real-time or near real-time complex patterns associated with a user, groups or users, or non-person entity after one or more activities have been executed by a user or non-person entity, an event associated with a user or non-person entity occurs, or on demand e.g., in response to a user request.

In some embodiments, a user or administrator may interact with the insights inference system 100 via a display 113 and a user input device interface 121. The input device interface 121 may include, e.g., a mouse, a keyboard, a touch panel of the display 113, motion tracking and/or detecting, a microphone, an imaging device such as a digital camera, among other input devices. Results and statuses related to the insights inference system 100 and operation thereof may be displayed to the user via the display 113. Some examples of such results and statuses include insights, causes or drivers of such insights, impact of such insights, recommendation with respect of such insights, and other suitable results or statuses associated with a user, groups of users, or non-person entities.

As shown in FIG. 1, communication bus 101 can also couple the insights inference system 100 to a network (e.g., network 907 shown in FIG. 9) through a network communication interface 111. In this manner, the insights inference system 100 can be part of a network of computers (for example a local area network ("LAN"), a wide area network ("WAN"), or an Intranet, or a network of networks, for example the Internet. Any or all components of the insights inference system 100 can be used in conjunction with the subject technology.

FIG. 2 illustrates examples of internal devices 200 of an insights inference engine, in accordance with one or more embodiments of the present disclosure. In some embodiments, the example of the inference engine 117 includes one or more insight engines and machine learning models including a first insight engine 201, a second insight engine 203, a machine learning model 205, and a natural language generation engine 207.

In some embodiments, the first insight engine 201 can produce insights associated with a user, a group of users, or a non-person entity based on, for example, tracked historical insights requests. In some instances, the first insight engine 201 can produce insights based on queries frequently inputted to the insights inference system 100, and/or based on historical data associated with a user, group of users, or a non-person entity. In some implementations, the first insight engine 201 can detect, predict, or infer insights by, for example, by the application of a statistical data process or statistical data analysis. In some implementations, the first insight engine 201 can detect, predict, or infer insights by applying a trend analysis to extract underlying data patterns from historical time series. Such underlying data patterns can be partly or nearly completely hidden by noise i.e., not observable to the naked eye. In some embodiments, the trend analysis can include one or more of a linear regression analysis, Mann-Kendall test analysis, autoregressive moving average models, weighted least square analysis, and other suitable trend analysis technique. In some implementations, the first insight engine 201 can detect, predict, or infer insights by applying, a Pareto analysis over the historical data to, for example, determine an optimal equilibrium or balance between competitive interest or competitive goals of two or more entities. In some other implementations, the first insight engine 201 can detect, predict, or infer insights by comparing historical data associated with a user, group of users, or non-person entity by comparing the historical data against a standard data, or benchmark to evaluate, for example, performance or effectiveness of a process, a user, a group of users, or a non-person entity.

In some embodiments, the second insight engine 203 can detect, predict, or infer insights using, for example, insights produced by the first insight engine 201. In some implementations, the second insight engine 203 can detect, predict, or infer, the cause of an insight, the impact of an insight, and a recommendation for an insight produced and received from the first insight engine 201. In some implementations, the second insight engine 203 can execute a root cause analysis to determine the cause of an insight, the impact of an insight and/or a recommendation for an insight. In some implementations, the second insight engine 203 can use the outcome of the root cause analysis to detect, predict, or infer an impact of an insight and a set of recommendations for such an insight.

In some embodiments, a machine learning model 205 can be built with the insights produced by first insight engine 201 and the second insight engine 203. In some implementations, the machine learning model 205 can associate insights to queries or questions. Accordingly, the machine learning model 205 can detect, predict, or infer insights for multiple queries or questions. In some instances, the machine learning model 205 can receive a query and in response to the query can produce a set of insights. The machine learning model 205 can be trained, for example, to receive a set of queries, and produce for each query from the set of queries an insight, a driver or cause of the insight, an impact of the insight, a recommendation related to the query or insights or other suitable insight related to the query. An example of a machine learning model in accordance with one or more embodiments of the present disclosure is discussed with reference to FIG. 3 and FIG. 4.

In some embodiments, a natural language generation engine 207 can convert data produced by the first insight engine 201, the second insight engine 203, and/or the machine learning model 205 into sentences. In some instances, the natural language generation engine 207 can build narratives or storylines joining insights, cause or driver of an insight, impact of an insight, and/or recommendations for one or more insights. The natural language generation engine 207 can apply, for example, an automatic summarization technique, a morphological segmentation technique, a word sense disambiguation technique (e.g., sentence boundary disambiguation), word segmentation, template-based generation, rule-based generation, and other suitable natural language generation techniques.

Figure 3:
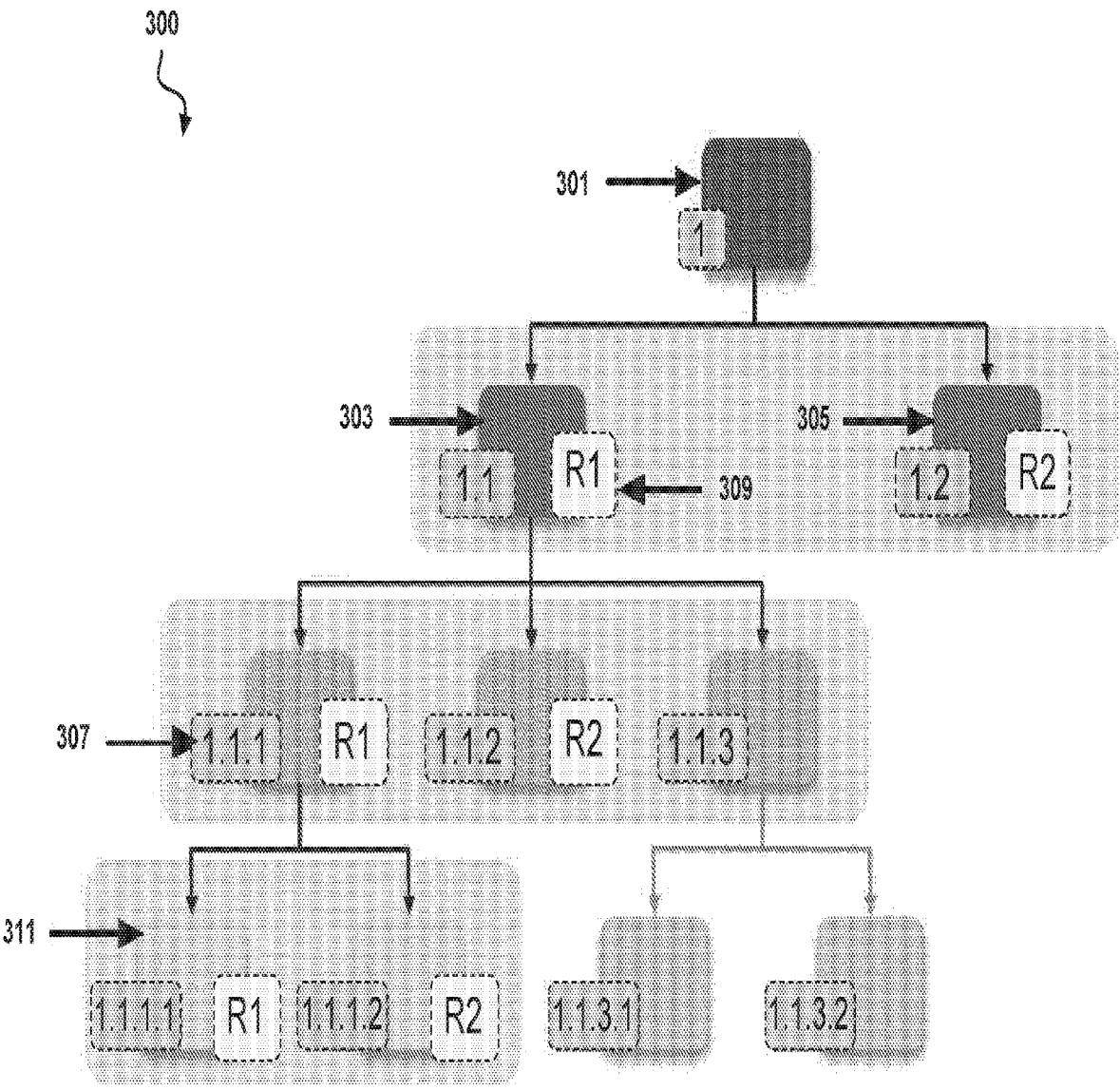

FIG. 3 illustrates an example of a machine learning model to respond to queries and produce insights, in accordance with one or more embodiments of the present disclosure. The example of the machine learning model depicted in FIG. 3 corresponds to a decision tree model 300. In some implementations, the example of a decision tree model 300 assembles or arranges a set of questions and insights in a hierarchical or sequential order. Each of the nodes in the decision tree model 300 (e.g., node 301, node 303, and node 305) can be associated with a query or question and/or at least one insight. The hierarchical or sequential order is represented by, for example, sequence numbers associated with each node, e.g., the sequence number shown at 307.

In some embodiments, at each level of the decision tree model 300, each child node is ranked with a significance score corresponding to a relevancy value with respect to a query or insight e.g., rank or significance score shown at 309. In the example of the decision tree model 300 the node 303 has a higher rank or significance score than the rank or significance score of the node 305, with respect to a question or query. Accordingly, in some instances, the decision tree may be traversed via node 303 and/or node 305 depending on how relevant the node insights are to respond a given query or question and/or how relevant the node insights are to the entity submitting such a query or question i.e., customized for that entity.

In some instances, the decision tree model 300 can be traversed in response to one or more queries or questions submitted by a user. For instance, a user can input the question e.g., "What is my overall spend behavior?" thereafter the insights inference engine 117 can select to traverse the decision tree model 300 upon a determination that the insights for such a question are associated with the parent node 301 and/or the children nodes of the parent node 301, (e.g., node 303 and node 305) or other descendant node of parent node 301. For example, node 303 can be associated with insights related to how much a user has spent this year traveling compared to last year and node 305 can be associated with other insights related to the overall spend behavior of that user.

In some embodiments, the insights inference engine 117 traverses the decision tree model 300 based on the sequence number and the rank or significance score associated with each child node. The type of insights associate with each node of the decision tree model 300, the value of the sequence number of each node, and the value of the rank or significance score of each node can change depending on: a)

the type of submitted question or query, and b) the user or non-person entity submitting a question or query to the decision tree model 300. For instance, each node can be associated with different values (sequence and ranking values) depending on a user, groups of users, or non-person entity submitting a query or question to the decision tree model 300. Accordingly, the type and/or order in which insights are presented in response to a query or question may vary depending on the submitted query or question and the entity submitting the question or query.

In some embodiments, insights, causes or drivers of such insights, impact of such insights, and recommendation with respect of such insights can be computed in response to one or more queries and a partial or complete traversal of the decision tree model 300 from a parent node to a leaf node (e.g., leaf node 311). The insights, sequence number, and rank or significance score associated with one or more nodes of the decision tree model 300, and the structure of the decision tree model 300 can be updated (via insights inference engine 117 discussed with reference to FIG. 3) at periodic time intervals, in real-time, or near real-time to accurately reflect updated insights computed form data values or data points associated with new historical data retrieved from database or storage device 103.

Figure 4:
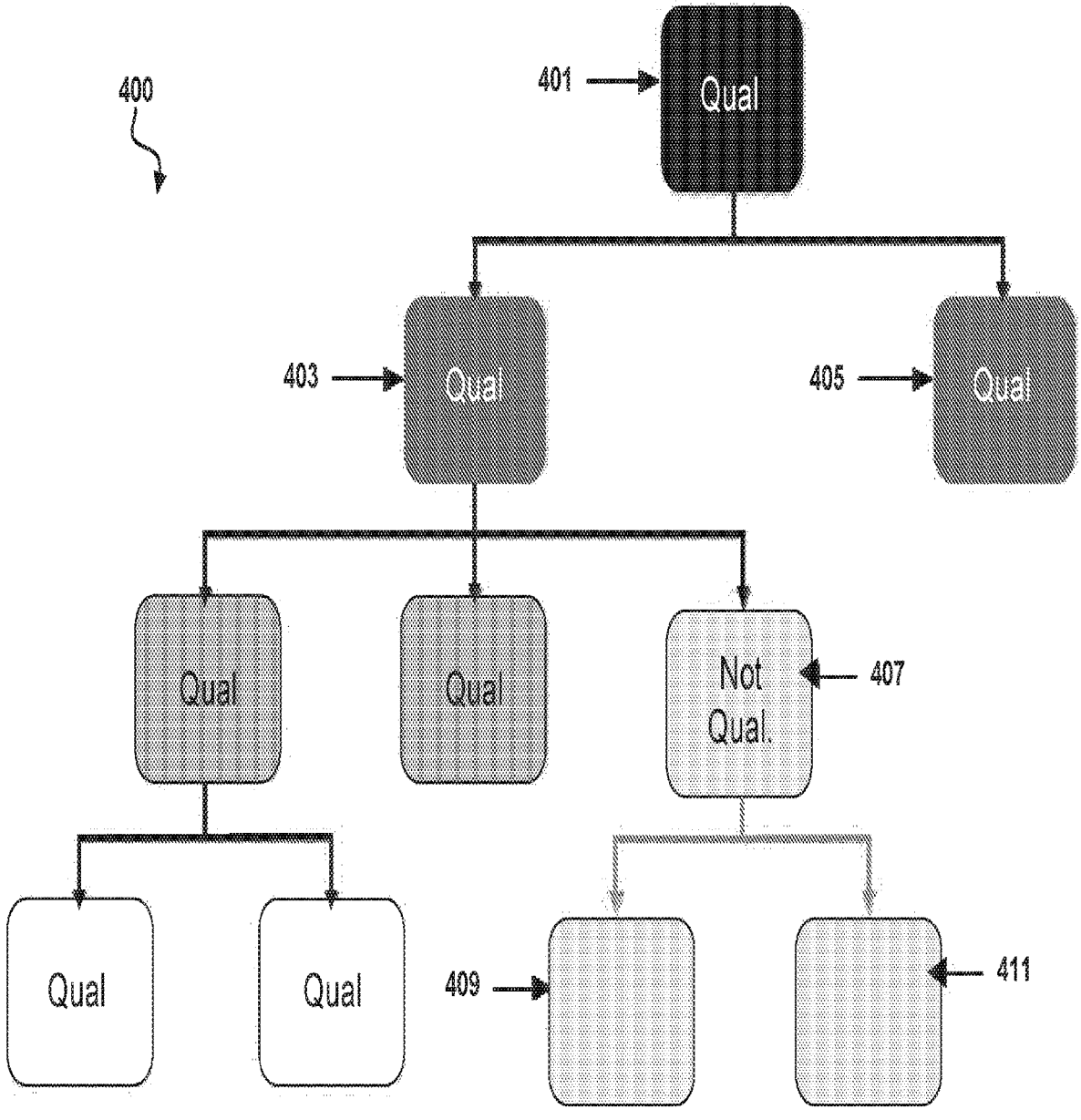

FIG. 4 illustrates an example of insights evaluation performed by an example of a machine learning model, in accordance with one or more embodiments of the present disclosure. In some instances, some of the nodes of the decision tree 400 can be discarded for their traversal and/or not use in the response to a given query or question. For instance, in the example shown in FIG. 4 the decision tree model can determine that the insights associated with nodes 401, 403, and 405 may be relevant to a user, groups of users, or non-person entity. In contrast, the decision tree model can determine that the insights associated with nodes 407, 409, and 411 may not be relevant to a user, group of users, or non-person entity. Such a determination can be based on the rank or significance score associated with each node and/or the sequence number associated with each node. Accordingly, the insights inference engine can save computational resources by not traversing one or more branches of the decision tree model while providing more accurate and relevant insights to users.

FIG. 5 is a flow chart 500 illustrative of computations executed by an insights inference system, in accordance with one or more embodiments of the present disclosure. In some embodiments, at 501 the insights inference system can produce a first insight associated with an entity based on, for example, tracked historical data or tracked historical insights requests. Thereafter, at 503 the insights inference system can produce at least one second insight from an application of at least one of a root cause analysis and/or an impact analysis using the first insight. The insights inference system is configured to receive at least one query from a client terminal as shown at 505. Such a query can be submitted by a user, a group of users, or a non-person entity. The insights inference system uses the submitted query to traverse the decision tree model to compute at least one insight in response to the submitted query as shown at 507. As discussed above with reference to FIG. 3, the insights inference system traverses the decision tree model based on a sequence number and a rank number associated with each child node of the decision tree model until a suitable response insight or insights are detected, predicted, or inferred. The suitable response insights can be outputted to a client terminal as shown at 509. The suitable response insights may be detected, predicted, or inferred by identifying one or more nodes that based on their sequence value and rank value provide relevant response insights to the submitted query. Examples of such insights can include one or more insights, causes or drivers of such insights, impact of such insights, recommendation with respect of such insights, and other suitable results or statuses associated with such insights. Some examples of such insights are further discussed below with reference to FIG. 7 and FIG. 8.

FIG. 6 is an example of a flow chart 600 illustrative of computations executed by an insights inference system, in accordance with one or more embodiments of the present disclosure. In some embodiments, at 601 the insights inference system assigns an insight associated with a question or query to a node of the decision tree model. Thereafter, at 603 the insights inference system can assign another insight associated with a different question or query to, for example, a child node of the of the decision tree model. At 605, the insights inference system assigns to at least one child node of the decision tree model a sequence value and a rank or significance score corresponding to a relevancy value with respect to a query, an insight and/or an entity or user. As discussed above with reference to FIG. 3 and FIG. 4, the insights inference system, utilizes the sequence value and the rank or significance score to traverse the decision tree model.

Figure 7:
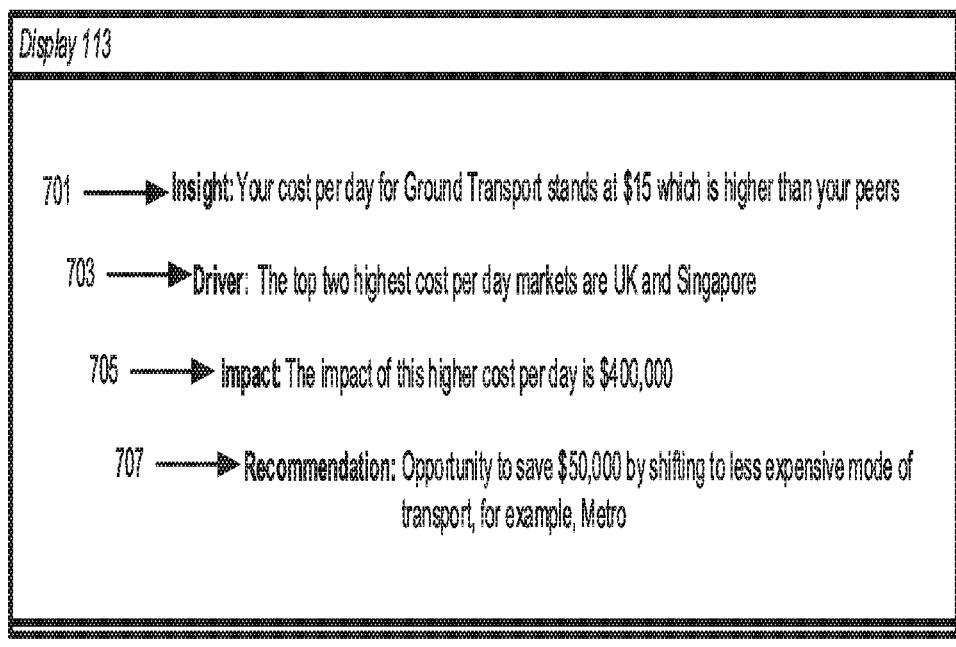

FIG. 7 illustrates an example of a summarized view 700 of detected, predicted, and/or inferred insights, in accordance with one or more embodiments of the present disclosure. In some embodiments, the insights inference system can output a summarized view of detected, predicted, and/or inferred insights in response to one or more queries or questions submitted by a user via a computing device. For example, a submitted query or question can be "What is my cost per day for ground transport?" The insights inference system can respond in real-time, or near-real time with a set of customized insights including an insight 701, the driver or cause of such an insight 703, the impact of such an insight 705, and a recommendation for such an insight 707.

FIG. 8 illustrates an example of trend insights 800 detected, predicted, and/or inferred by the insights inference system, in accordance with one or more embodiments of the present disclosure. In some embodiments, the insights inference system can, for example, output a detailed report regarding trends or other suitable patterns related to a user, group or users, or non-person entity. In the example shown in FIG. 8, the insights inference system outputs via, for example, display 113 discussed with respect to FIG. 1, insights regarding advanced airline bookings. Specifically, FIG. 8 shows a comparison between the cost of bookings airline flights within 14 days of travel for an entity and compares such a cost with costs associated with the same activity of another entity. As discussed above, the insights inference system can further detect, predict, and/or inferred the driver or cause of an insight as the one illustrated in FIG. 8, the impact associated with such an insight, and a recommendation associated with such an insight.

Figure 9:
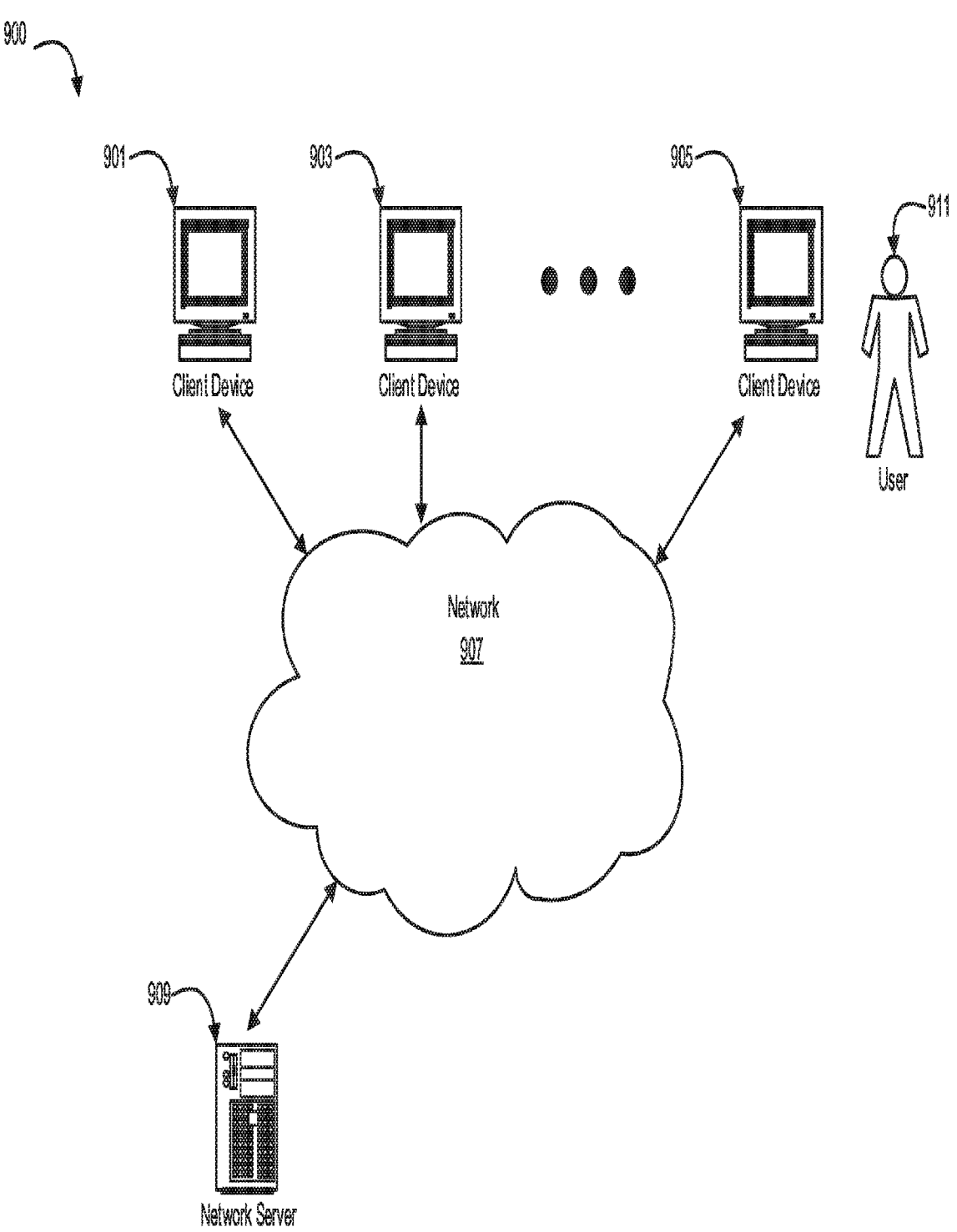

FIG. 9 depicts a block diagram of an example of a computer-based system 900, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the examples of the computing components of the computer-based system 900 may be configured to manage large numbers of members and/or concurrent transactions or electronic activities, as detailed herein. In some embodiments, the computer-based system 900 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 901, 903, and 905 (e.g., clients) of the computer-based system 900 may include virtually any computing device capable of receiving and sending a message over a network (e.g., cloud network), such as network 907, to and from another computing device, such as server 909, and the like. In some embodiments server 909 can implement the insights inference system discussed above with reference to FIG. 1. In some embodiments server 909 can be part of a financial institution system, merchant system, online store system, or other suitable entity capable of registering historical data associated with a user, group of users and/or non-person entity. In some embodiments server 909 can implement the database or storage device 103 discussed above with reference to FIG. 1. In some embodiments the member devices 901, 903, and 905 can be used to submit (for example by user 911) queries or questions to the insights inference system. In some embodiments, the member devices 901, 903, and 905 may be personal computers, multiprocessor systems, microprocessor-based or programmable consumer electronics, network PCs, and the like. In some embodiments, one or more member devices within member devices 901, 903, and 905 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 901, 903, and 905 may be devices that are capable of connecting using a wired or wireless communication medium such as, wearable computer, a laptop, tablet, desktop computer, a netbook, a video game device, a pager, a smart phone, and/or any other device that is equipped to communicate over a wired and/or wireless communication medium. In some embodiments, one or more member devices within member devices 901, 903, and 905 may run one or more applications, such as Internet browsers, mobile applications, voice calls, video games, videoconferencing, and email, among others. In some embodiments, one or more member devices within member devices 901, 903, and 905 may be configured to receive and to send web pages, and the like. In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 901, 903, and 905 may be specifically programmed by either Java, .Net, QT, C, C++ and/or other suitable programming language. In some embodiments, one or more member devices within member devices 901, 903, and 905 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 907 may provide network access, data transport and/or other services to any computing device coupled to it. In some embodiments, the network 907 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 907 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 907 may include and implement, as an alternative or in conjunction with one or more of the above, a WiMAX architecture defined by the WiMAX forum. In some embodiments and, optionally, in combination of any embodiment described above or below, the network 907 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 907 may be transmitted based at least in part on one of more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 707 may also include mass storage, such as Network Attached Storage (NAS), a Storage Area Network (SAN), a Content Delivery Network (CDN) or other forms of computer or machine-readable media.

In some embodiments, the server 909 may be a web server (or a series of servers) running a network operating system. In some embodiments, the server 909 may be used for and/or provide cloud and/or network computing. Although not shown in FIG. 9, in some embodiments, the server 909 may have connections to external systems like email, SMS messaging, text messaging, ad content providers, etc.

In some embodiments, the server 909 may be specifically programmed to perform, in non-limiting example, as authentication servers, search servers, email servers, social networking services servers, exchange servers, photo-sharing services servers, advertisement providing servers, financial/banking-related services servers, travel services servers, or any similarly suitable service-base servers for users of the member computing devices 901, 903, and 905.

In some embodiments and, optionally, in combination of any embodiment described above or below, for example, one or more examples of computing member devices 901, 903, and 905, the server 909, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

As used herein, the terms "computer engine" and "engine" identify at least one software component and/or a combination of at least one software component and at least one hardware component designed/programmed/configured to interact with other software and/or hardware components and/or compute system outputs.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software.

In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

As used herein, term "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by a hardware of one type running (Operating System) OS of one type may emulate hardware of a different type and/or an OS of a different type, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

At least some aspects of the present disclosure will now be described with reference to the following numbered clauses.

1. An apparatus, comprising:
    at least one processor;
        and a memory storing instructions which, when executed by the at least one processor, causes the processor to:
            produce a first data insight associated with an entity based on tracked data regarding historical insights requests;
            produce at least one second data insight from an application of at least one of a root cause analysis or an impact analysis, wherein the application uses the first data insight;
            generate at least one decision tree machine learning model by:
                i) assigning the first data insight to a parent node from a plurality of nodes of the at least one decision tree machine learning model; and
                ii) assigning each of the at least one second data insight to a different child node from a plurality of child nodes of the at least one decision tree machine learning model;

receive at least one query from a client terminal, wherein the at least one query is associated with the entity; and utilize the at least one decision tree machine learning model to output at least one response data insight to the client terminal.

2. The apparatus of clause 1, wherein the first data insight associated with the entity is produced based on at least one statistical analysis.

3. The apparatus of any of clauses 1 to 2, wherein the at least one statistical analysis comprises at least one of a trending statistical analysis, Pareto statistical analysis, and benchmarking statistical analysis.

4. The apparatus of any of clauses 1 to 3, wherein each child node from the plurality of child nodes is associated with a sequence number and a rank number, and wherein the sequence number and the rank number are indicative of a significance associated with the at least one second insight.

5. The apparatus of any of clauses 1 to 4, wherein utilize the at least one decision tree machine learning model comprises traverse the at least one decision tree machine learning model to compute the at least one response data insight in response to the at least one query, wherein the traverse of the at least one decision tree machine learning model is based on the sequence number and the rank number associated with each child node from the plurality of child nodes of the decision tree machine learning model.

6. The apparatus of clause 1, wherein the at least one second data insight comprises at least one of a cause insight, impact insight, and recommendation insight.

7. The apparatus of clause 1, wherein the at least one response data insight is generated at least in part utilizing a natural language generation technique.

8. The apparatus of clause 1, wherein the first data insight and the at least one second data insight are updated based on a periodic time interval.

9. The apparatus of clause 1, wherein the at least one response data insight comprises a data pattern associated with the entity and, wherein the data pattern is generated in real time or near real time.

10. The apparatus of clause 1, wherein the entity is a first entity and the at least one response data insight comprises a comparison of a third data insight and a fourth data insight, wherein the third data insight is associated with the first entity and the fourth data insight is associated with a second entity.

11. A method, comprising:

producing, by a processor, a first data insight associated with an entity based on tracked data regarding historical insights requests;

producing, by the processor, at least one second data insight from an application of at least one of a root cause analysis or an impact analysis, wherein the application uses the first data insight;

generating, by the processor, at least one decision tree machine learning model by:

i) assigning the first data insight to a parent node from a plurality of nodes of the at least one decision tree machine learning model; and ii) assigning each of the at least one second data insight to a different child node from a plurality of child nodes of the at least one decision tree machine learning model;

receiving, by the processor, at least one query from a client terminal, wherein the at least one query is associated with the entity; and utilizing, by the processor, the at least one decision tree machine learning model to output at least one response data insight to the client terminal.

12. The method of clause 11, wherein the first data insight associated with the entity is produced based on at least one statistical analysis.

13. The method of any of the clauses 11 to 12, wherein the at least one statistical analysis comprises at least one of a trending statistical analysis, Pareto statistical analysis, and benchmarking statistical analysis.

14. The method of any of the clauses 11 to 13, wherein each child node from the plurality of child nodes is associated with a sequence number and a rank number, and wherein the sequence number and the rank number are indicative of a significance associated with the at least one second insight.

15. The method of any of the clauses 11 to 14, wherein utilizing the at least one decision tree machine learning model comprises traversing the at least one decision tree machine learning model to compute the at least one response data insight in response to the at least one query, wherein the traversing of the at least one decision tree machine learning model is based on the sequence number and the rank number associated with each child node from the plurality of child nodes of the decision tree machine learning model.

16. The method of claim 11, wherein the at least one second data insight comprises at least one of a cause insight, impact insight, and recommendation insight.

17. The method of claim 11, wherein the at least one response data insight is generated at least in part utilizing a natural language generation technique.

18. The method of claim 11, wherein the at least one response data insight comprises a data pattern associated with the entity and, wherein the data pattern is generated in real time or near real time.

19. The method of claim 11, wherein the entity is a first entity and the at least one response data insight comprises a comparison of a third data insight and a fourth data insight, wherein the third data insight is associated with the first entity and the fourth data insight is associated with a second entity.

20. A non-transitory computer readable medium comprising code which, when executed by a processor, causes the processor to:

produce a first data insight associated with an entity based on tracked data regarding historical insights requests;

produce at least one second data insight from an application of at least one of a root cause analysis or an impact analysis, wherein the application uses the first data insight;

generate at least one decision tree machine learning model by:

i) assigning the first data insight to a parent node from a plurality of nodes of the at least one decision tree machine learning model; and ii) assigning each of the at least one second data insight to a different child node from a plurality of child nodes of the at least one decision tree machine learning model;

receive at least one query from a client terminal, wherein the at least one query is associated with the entity; and utilize the at least one decision tree machine learning model to output at least one response data insight to the client terminal.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. A method, comprising:

receiving, by an inference engine, a query from a client terminal;

in response to receiving the query, executing instructions to cause the inference engine to perform operations comprising:

retrieving, from a database, a data set associated with the query;

generating, based on the data set, a decision tree model with a parent node and a plurality of child nodes, wherein the parent node is associated with the data set and the plurality of child nodes are associated with the parent node, and wherein the plurality of child nodes respectively correspond to a plurality of subsets of the data set, further comprising:

assigning a first insight comprising a sequence number associated with the data set into the parent node of the decision tree model, and assigning, into a subset of the plurality of child nodes of the decision tree model, a second insight based on another sequence number that the subset of the plurality of child nodes follow from the parent node, wherein the second insight comprises the other sequence number and a rank number that are associated with a subset of the plurality of subsets of the data set, wherein the parent node and the plurality of child nodes have respectively corresponding sequence numbers, and wherein the subset of the plurality of child nodes have respectively corresponding rank numbers;

traversing the decision tree model based on the corresponding sequence numbers and the corresponding rank numbers to identify the parent node and the plurality of child nodes, wherein the traversing bypasses one or more nodes in the decision tree model that are not relevant to the query;

providing, to a natural language generator, the first insight assigned to the parent node and the second insight assigned to the subset of the plurality of child nodes to generate a textual summary of the data set;

in response to the textual summary being generated, compiling the textual summary of the data set, wherein the textual summary includes the first insight corresponding to the parent node, the second insight corresponding to the subset of the plurality of child nodes that have the respectively corresponding rank numbers, and a third insight corresponding to a comparison between the first insight and the second insight; and generating a graphical user interface (GUI) including the textual summary of the data set for display at the client terminal.

2. The method of claim 1, wherein the sequence number indicates an order to traverse the parent node and the plurality of child nodes of the decision tree model.

3. The method of claim 1, wherein the rank number indicates a relevancy of the plurality of subsets of the data set associated with the parent node respectively corresponding to the plurality of child nodes to the query.

4. The method of claim 1, further comprising:

updating the GUI to include a graph representation of first transaction data of a first entity and second transaction data of a second entity, wherein the first transaction data is the data set associated with the parent node of the decision tree model.

5. The method of claim 4, wherein the graph representation includes a time series of transaction data related to the query.

6. The method of claim 1, wherein the query is a natural language text query related to spending behavior and wherein the data set includes transaction data.

7. The method of claim 1, further comprising:

determining a fourth insight corresponding to a course of action recommendation based on traversal of the decision tree model.

8. The method of claim 1, wherein, within the generated decision tree model, the parent node having a respectively corresponding sequence number is assigned with the first insight and the subset of the plurality of child nodes having the respectively corresponding rank numbers is assigned with the second insight, wherein the first insight is generated based on one or more historical insight requests, and wherein the second insight is generated based on the respectively corresponding sequence numbers.

9. A non-transitory computer-readable medium having instructions stored thereon that, when executed by at least one computing device, cause the at least one computing device to perform operations comprising:

receiving, by the at least one computing device, a query from a client terminal;

in response to receiving the query, executing the instructions to cause the at least one computing device to perform the operations comprising:

retrieving, from a database, a data set associated with the query;

generating, based on the data set, a decision tree model with a parent node and a plurality of child nodes, wherein the parent node is associated with the data set and the plurality of child nodes are associated with the parent node, and wherein the plurality of child nodes respectively correspond to a plurality of subsets of the data set, further comprising:

assigning a first insight comprising a sequence number associated with the data set into the parent node of the decision tree model, and assigning, into a subset of the plurality of child nodes of the decision tree model, a second insight based on another sequence number that the subset of the plurality of child nodes follow from the parent node, wherein the second insight comprises the other sequence number and a rank number that are associated with a subset of the plurality of subsets of the data set, wherein the parent node and the plurality of child nodes have respectively corresponding sequence numbers, and wherein the subset of the plurality of child nodes have respectively corresponding rank numbers;

traversing the decision tree model based on the corresponding sequence numbers and the corresponding rank numbers to identify the parent node and the plurality of child nodes, wherein the traversing bypasses one or more nodes in the decision tree model that are not relevant to the query;

providing, to a natural language generator, the first insight assigned to the parent node and the second insight assigned to the subset of the plurality of child nodes to generate a textual summary of the data set;

in response to the textual summary being generated, compiling the textual summary of the data set, wherein the textual summary includes the first insight corresponding to the parent node, the second insight corresponding to the subset of the plurality of child nodes that have the respectively corresponding rank numbers, and a third insight corresponding to a comparison between the first insight and the second insight; and generating a graphical user interface (GUI) including the textual summary of the data set for display at the client terminal.

10. The non-transitory computer-readable medium of claim 9, wherein the sequence number indicates an order to traverse the parent node and the plurality of child nodes of the decision tree model.

11. The non-transitory computer-readable medium of claim 9, wherein the rank number indicates a relevancy of the plurality of subsets of the data set associated with the parent node respectively corresponding to the plurality of child nodes to the query.

12. The non-transitory computer-readable medium of claim 9, further comprising:

updating the GUI to include a graph representation of first transaction data of a first entity and second transaction data of a second entity, wherein the first transaction data is the data set associated with the parent node of the decision tree model.

13. The non-transitory computer-readable medium of claim 9, wherein the query is a natural language text query related to spending behavior and wherein the data set includes transaction data.

14. The non-transitory computer-readable medium of claim 9, wherein, within the generated decision tree model, the parent node having a respectively corresponding sequence number is assigned with the first insight and the subset of the plurality of child nodes having the respectively corresponding rank numbers is assigned with the second insight, wherein the first insight is generated based on one or more historical insight requests, and wherein the second insight is generated based on the respectively corresponding sequence numbers.

15. A system, comprising:

a memory;

an inference engine;

at least one processor coupled to the memory and configured to perform operations comprising:

receiving, by the inference engine, a query from a client terminal;

in response to receiving the query, executing instructions to cause the inference engine to perform the operations comprising:

retrieving, from a database, a data set associated with the query;

generating, based on the data set, a decision tree model with a parent node and a plurality of child nodes, wherein the parent node is associated with the data set and the plurality of child nodes are associated with the parent node, and wherein the plurality of child nodes respectively correspond to a plurality of subsets of the data set, further comprising:

assigning a first insight comprising a sequence number associated with the data set into the parent node of the decision tree model, and assigning, into a subset of the plurality of child nodes of the decision tree model, a second insight based on another sequence number that the subset of the plurality of child nodes follow from the parent node, wherein the second insight comprises the other sequence number and a rank number that are associated with a subset of the plurality of subsets of the data set, wherein the parent node and the plurality of child nodes have respectively corresponding sequence numbers, and wherein the subset of the plurality of child nodes have respectively corresponding rank numbers;

traversing the decision tree model based on the corresponding sequence numbers and the corresponding rank numbers to identify the parent node and the plurality of child nodes, wherein the traversing bypasses one or more nodes in the decision tree model that are not relevant to the query;

providing, to a natural language generator, the first insight assigned to the parent node and the second insight assigned to the subset of the plurality of child nodes to generate a textual summary of the data set;

in response to the textual summary being generated, compiling the textual summary of the data set, wherein the textual summary includes the first insight corresponding to the parent node, the second insight corresponding to the subset of the plurality of child nodes that have the respectively corresponding rank numbers, and a third insight corresponding to a comparison between the first insight and the second insight; and generating a graphical user interface (GUI) including the textual summary of the data set for display at the client terminal.

16. The system of claim 15, wherein the sequence number indicates an order to traverse the parent node and the plurality of child nodes of the decision tree model.

17. The system of claim 15, wherein the rank number indicates a relevancy of the plurality of subsets of the data set associated with the parent node respectively corresponding to the plurality of child nodes to the query.

18. The system of claim 15, further configured to:

update the GUI to include a graph representation of first transaction data of a first entity and second transaction data of a second entity, wherein the first transaction data is the data set of the decision tree model.

19. The system of claim 15, wherein the query is a natural language text query related to spending behavior and wherein the data set includes transaction data.

20. The system of claim 15, wherein, within the generated decision tree model, the parent node having a respectively corresponding sequence number is assigned with the first insight and the subset of the plurality of child nodes having the respectively corresponding rank numbers is assigned with the second insight, wherein the first insight is generated based on one or more historical insight requests, and wherein the second insight is generated based on the respectively corresponding sequence numbers.

* * * * *